United States Patent [19]

Mayberry

[11] Patent Number: 4,867,866

[45] Date of Patent: Sep. 19, 1989

[54] MUNICIPAL WASTE PROCESSING APPARATUS

[75] Inventor: John L. Mayberry, Idaho Falls, Id.

[73] Assignee: The United States of America as represented by the United States Department of Energy, Washington, D.C.

[21] Appl. No.: 180,879

[22] Filed: Apr. 13, 1988

Related U.S. Application Data

[63] Continuation-in-part of Ser. No. 3,523, Jan. 15, 1987, Pat. No. 4,778,116.

[51] Int. Cl.$^4$ ............................................. B07B 9/02
[52] U.S. Cl. ...................................... 209/30; 209/133; 209/639; 241/79.1
[58] Field of Search .................... 241/24, 79, 79.1; 209/307, 308, 311, 312, 313, 314, 466, 470, 487, 133, 142, 639, 30

[56] References Cited

U.S. PATENT DOCUMENTS

| | | | |
|---|---|---|---|
| 1,715,197 | 5/1929 | Grabill | 209/307 X |
| 2,294,086 | 8/1942 | Hinds et al. | 209/470 |
| 2,772,776 | 12/1956 | Myron | 209/470 X |
| 3,159,270 | 12/1964 | Johnston . | |
| 3,779,379 | 12/1973 | Buchbinder et al. . | |
| 3,888,351 | 6/1975 | Wilson . | |
| 4,076,124 | 2/1978 | Taysom et al. . | |
| 4,146,483 | 3/1979 | Lee . | |
| 4,289,614 | 9/1981 | Suzuki | 209/308 |
| 4,291,294 | 3/1980 | McGrath et al. | 209/142 X |
| 4,341,353 | 7/1982 | Hamilton et al. . | |

FOREIGN PATENT DOCUMENTS

| | | | |
|---|---|---|---|
| 684759 | 4/1964 | Canada | 209/133 |
| 2311315 | 9/1974 | Fed. Rep. of Germany | 209/307 |
| 7007889 | 12/1971 | Netherlands | 209/307 |

OTHER PUBLICATIONS

Vibrating Mesh Screen Conveyor Concept Design, 1/86.

*Primary Examiner*—Mark Rosenbaum
*Attorney, Agent, or Firm*—Hugh W. Glenn; Robert J. Fisher; Judson R. Hightower

[57] ABSTRACT

Municipal waste materials are processed by crushing the materials so that pieces of noncombustible material are smaller than a selected size and pieces of combustible material are larger than the selected size. The crushed materials are placed on a vibrating mesh screen conveyor belt having openings which pass the smaller, noncombustible pieces of material, but do not pass the larger, combustible pieces of material. Consecutive conveyors may be connected by an intermediate vibratory plate. An air knife can be used to further separate materials based on weight.

3 Claims, 5 Drawing Sheets

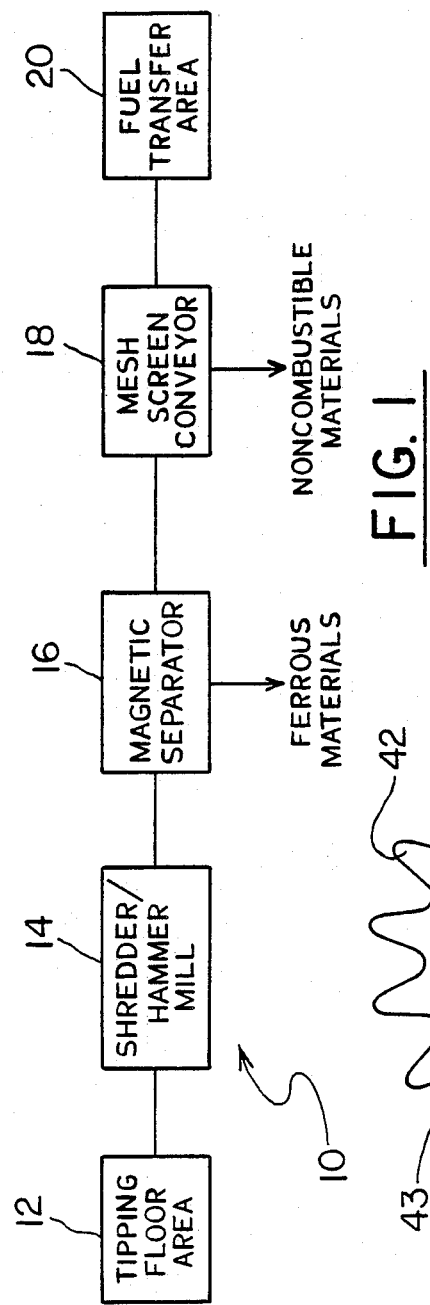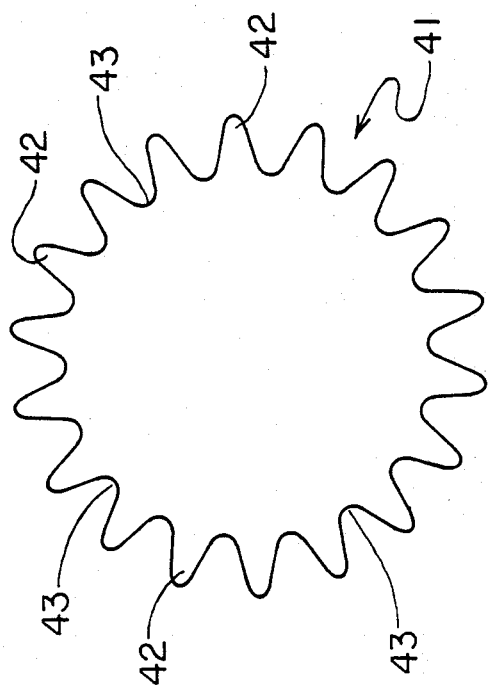

MUNICIPAL WASTE PROCESSING APPARATUS

CONTRACTUAL ORIGIN OF THE INVENTION

The U.S. has rights in this invention pursuant to Contract No. DE-AC07-76ID01570 between the U.S. Department of Energy and EG&G Idaho, Inc.

This application is a continuation in-part of U.S. application Ser. No. 003,523, filed Jan. 15, 1987, now U.S. Pat. No. 4,778,116, issued Oct. 18, 1988.

BACKGROUND OF THE INVENTION

This invention relates to apparatus for processing municipal waste, and more particularly to vibrating mesh screen conveyor systems for removing grit, glass, and other noncombustible materials from dry municipal waste.

Municipal waste mustbe properly processed and disposed of so that it does not create health risks to the community. Generally, municipal waste, which may be collected in garbage trucks, dumpsters, or the like, is deposited in processing areassuch as landfills. Land and environmental controls imposed on landfill operators by governmental bodies have increased in recent years, however, making landfill disposal of solid waste materials more expensive.

Municipal waste materials typically included noncombustible materials such as glass, metal, and grit, and combustible materials suchas paper. Disposal of the combustible materials by burning them eases the burden on landfill operators in complying with certain governmental regulations. In addition, increases in the cost of fossil fuels has enhanced the value of such combustible materials, because such materials may have up to half the heating value of coal, and can be substituted for or cofired with coal or other fossil fuels such as oil and natural gas.

Combustible waste materials, called refuse derived fuel, may be produced from municipal waste by mechanically separating combustible materials from glass, grip, metal, and other noncombustibles. Generally, particle size is reduced first by using shear shredders. Ferrous material is removed with magnetic separators, and trommels or disk screens separate combustible pieces from noncombustible pieces. However, trommels and disk screens, with related apparatus, are relatively expensive. Thus, there is a need for relatively inexpensive and efficient methods and apparatus for separating combustible from noncombustible materials in solid municipal waste.

Vibrating screen conveyors have been used for sorting vegetables and for separating litter from rocks along roadsides. However, such conveyors could become clogged if they were used to separate combustible from noncombustible waste materials because municipal waste typically includes wires, strps of various materials such as nylons, and other objects which can easily become caught in the screen. Thus, there is also a need for vibrating screen conveyors which separate combustible from noncombustible materials in municipal waste, without becoming clogged.

Accordingly, one object of this invention is to provide new and improved apparatus for processing municipal waste materials.

Another object is to provide new and improved vibrating screen conveyor systems for processing municipal waste materials.

Still another object is to provide new and improved vibrating screen conveyor systems for removing grip, glass, and other noncombustible matter from solid municipal waste materials.

SUMMARY OF THE INVENTION

In keeping with one aspect of this invention, apparatus for separating noncombustible from combustible matter in solid waste materials includes a crushing device for reducing the size of the solid waste and placing the waste particles on a vibrating feed plate which carries the waste particles to a vibrating mesh conveyor. The smaller particles pass through the mesh conveyor. An air knife blows the lighter generally combustible particles into a hood, while the heavier, generally noncombustible particles drop into a bin. In the alternative, after the first conveyor, the remaining particles may be transferred to a second conveyor via a second vibrating feed plate. The second conveyor may have a belt of different mesh size for further screening and classification of the waste particles. More particularly, the crushing device passes through the mesh, while most of the combustibles are retained on the conveyor.

A plurality of rotating cam or other suitable devices located along the edgesof the carrier surface of the conveyor vibrate the wiremesh. Crushed municipal waste materials which are placed on the carrier surface of the conveyor are shaken by the vibrating conveyor, causing noncombustible matter less than the selected size in the waste materials to fall through the mesh screen. A second, solid, conveyor located beneath the carrier surface of the mesh screen conveyor removes the particles which pass through the mesh screen conveyor. Combustible matter on the carrier surface which does not fall through the mesh screen conveyor is collected for further processing and later combustion. In one embodiment, the matter not falling through the screen may be transferred to a second vibrating mesh screen conveyor by a second vibrating feed plate. The mesh size of the second conveyor carrier is larger that the first conveyor to permit further selective screening of the remaining waste particles.

An air knife may also be used in a further embodiment to blow light material into a hood and baffle structure, while the heavier material is not affected by the air movement and is directed to a separate holding or testing area.

At least one elongated power driven cylinder having a plurality of axial grooves and teeth may be provided to engage the mesh screen conveyor and remove waste materials which may be lodged in the mesh screen. The cylinder is preferably removable for cleaning and replacing. In addition, stripsmay be provided along the edges of the mesh screen conveyor to prevent waste materials from clogging mechanical apparatus around the edges of and beneath the conveyor.

BRIEF DESCRIPTION OF THE DRAWINGS

The above-mentioned and other features of this invention and the manner of obtaining them will become more apparent, and the invention itself will be best understood by reference to the following description of the invention taken in conjunction with the accompanying drawings, in which:

FIG. 1 is a block diagram of a waste processing system made in accordance with this invention;

FIG. 3 is an end view of a deragger shown in the apparatus of FIG. 2;

DETAILED DESCRIPTION OF THE EMBODIMENT

Figure 2:
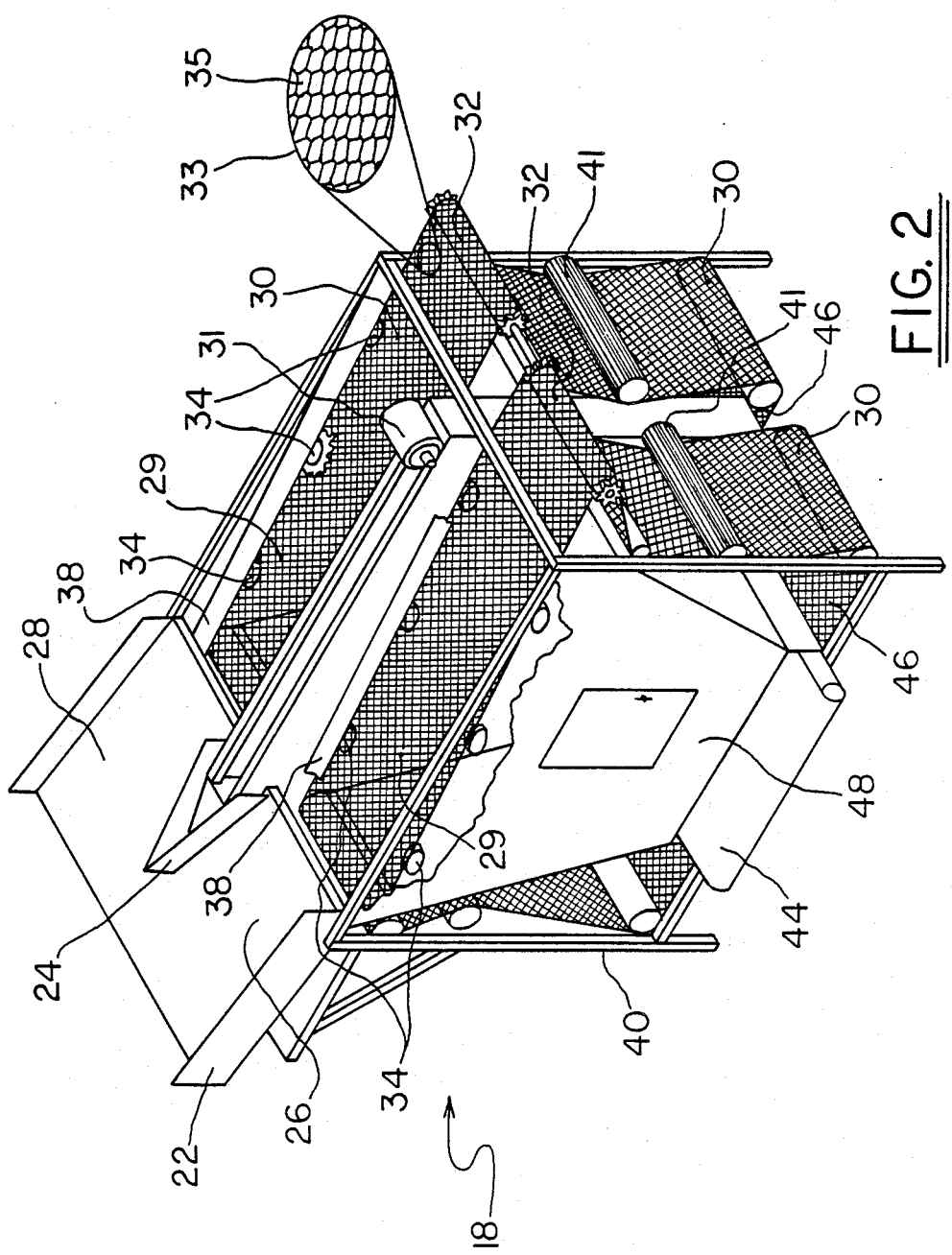
FIG. 2 is a perspective view of mesh screen conveyor apparatus made in accordance with the invention.

A municipal waste treatment system 10 is shown in block diagram form in FIG. 1. Municipal waste as might be collected in garbage trucks, dumpsters, or the like is deposited in a tipping floor area 12. The solid, generally dry waste materials include noncombustible materials such as grit, glass, metal, and the like, and other materials, such as paper and cardboard, which are combustible.

The tipping floor area 12 may be any suitable structure or apparatus which disposes the waste materials at a desired rate. The waste materials are initially sent from the floor area 12 through a shredder 14 that reduces the size of the waste materials by cutting or tearing the materials into pieces.

The shredder 14 breaks and tears the waste materials to create a size distribution of pieces of the material which is conducive to later processing. In general, noncombustibles such as glass, metal, grit, and the like can be reduced so that up to perhaps 95 percent of the noncombustible pieces are less than a first size in which no dimension is greater than a selected length. The selected length may be between about ¾ inch and 1 inch. Using the same shredding equipment under proper conditions, up to about 95 percent of the combustible pieces, such as paper products, will be of a larger size in which at least some dimensions are greater than the selected length. Pieces of paper, for example, would normally be only a few thousandths of an inch thick and could be less than one inch wide, but would likely be more than one inch long. A shear shredder such as model 1600-H from Shredding Systems, Inc., or a Williams model GA340 horizontal hammer mill, which is a type of shredder, might be suitable for this purpose. Generally, end product size control may be easier with the hammer mill than with a shear shredder.

Ferrous materials may be removed from the waste materials in a magnetic separator 16, preferably after shredding. In a typical magnetic separator, a series of electromagnets attract ferrous material in the waste for removal from the waste and further processing or disposal, and nonmagnetic materials are removed on conveyor belts.

Figure 4:
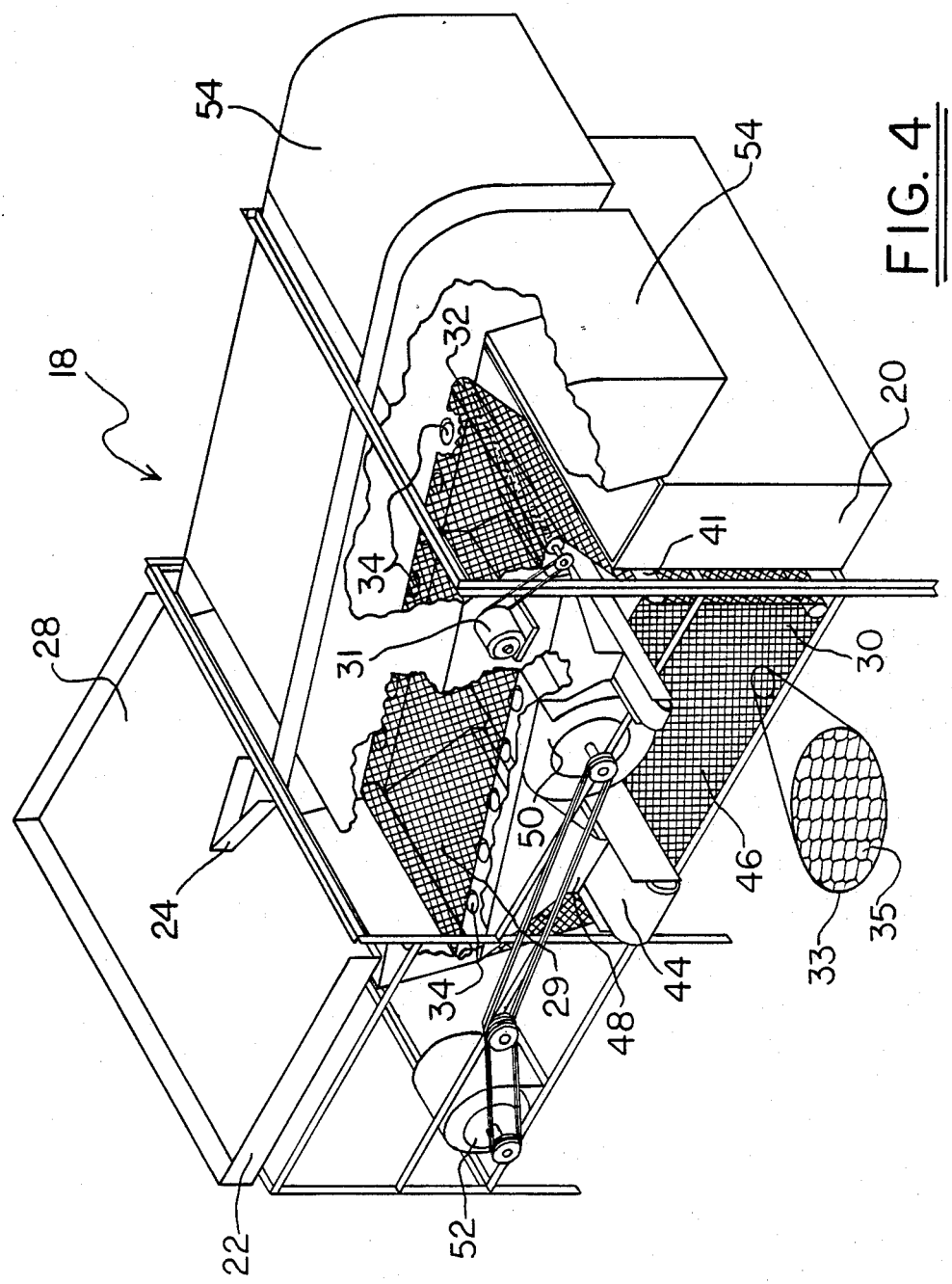
FIG. 4 is a perspective view of an alternate embodiment of the conveyor apparatus of FIG. 2.

The mixed nonferrous waste materials which leave the magnetic separator 16 are fed onto a vibrating mesh conveyor 18, which is shown in greater detail in FIGS. 2, 3, and 4. The conveyor 18 agitates the waste materials to remove glass, grit, grit, and other noncombustible matter from the waste materials. Combustible materials which are non incidentally removed with the noncombustibles are transported from the conveyor 18 (FIG. 1) to a suitable fuel transfer area 20. Most of the materials in the transfer area 20 are combustible and may be sold as a fuel for steam boilers, used for some other purpose, or simply burned as a method of disposal.

The conveyor 18 is shown in greater detail in FIGS. 2 and 3. Shredded waste materials are deposited on a feed plate 22, which is preferably vibrated by any suitable apparatus. The vibrations separate and align elongated pieces of material such as strips of paper so that they tend to lie substantially flat on the plate 22.

The feed plate 22 includes a separator 24 which divides the waste materials along two channels 26, 28. The crushed materials are fed from the feed plate 22 onto carrier surfaces 29 of two moving endless conveyor belts 20. The belts 30 are driven by a motor 31. The carrier surfaces 29 extend from the feed plate 22 to rollers 32, which are adjacent to the fuel transfer area 20.

The conveyor belts 30 are wire mesh screens, as seen in the enlarged portion 33 of the belt 30, with opening size, wire thickness, and strength varying for particular applications. If the size distribution of the waste materials is such that most of the noncombustibles are under one inch in size, the size of openings 35 in the mesh screen may be about one inch across, so that the noncombustibles can pass through the openings 35. The openings 35 are preferably a geometric shape such as a circle, an oval, or a hexagon, as seen in FIG. 2. The useful life of the belts may be increased by using abrasion-resistant and corrosion-resistant material, and by arranging the components of the system to minimize wear.

A plurality of cam-shaped vibrators 34 are located adjacent to and beneath the edges of both conveyor belts 30. The vibrators 34 are located in suitable places along the carrier surfaces 29. The vibrators 34 may be rotated by the motor 31 or any other suitable power source, and are adjusted so that the cams 34 vibrate the belts 30 as the cams 34 rotate. The vibrations move and agitate the noncombustible materials so that they fall through the openings in the belts 30.

The edges of the conveyor belts 30 are covered with rubber skirts 38. The skirts 38 are preferably secured to a frame 40 of the conveyor 18, and are provided to prevent waste materials from falling over the edges and beneath the belts 30, clogging the mechanical systems beneath the edges of the belts 30.

Most of the waste materials which do not pass through the belts 30 are removed near the rollers 32. However, elongated fragments of panty hose, pieces of wire, and the like may become caught in the mesh of the belts 30. Such fragments may be removed by cylindrical deraggers 41 (FIG. 3). The deraggers 41 may have a series of elongated teeth 42 separated by troughs 43. In addition, the deraggers 41 are preferably removable so that they may be cleaned or replaced easily.

A second conveyor belt 44 (FIG. 2) passes through the frame 40 between the carrier surfaces 29 and bottom surfaces 46 of the belts 30. The second conveyor belt 44, which is solid, is located beneath the carrier surfaces 29 so that particles which fall through the mesh screen of the belts 30 fall onto the second belt 44 for removal and further processing or disposal. A suitable funneling structure 48 may be used to direct the noncombustible materials onto the second conveyor belt 44.

An alternate embodiment of the conveyor apparatus of FIG. 2 is shown in FIG. 4. At least one blower 50 is provided to force air upwardly through a portion of the carrier surfaces 29, to further agitate the waste materials and loosen objects which become plugged in holes in the mesh screens of the belts 30. The blower 50 is driven by a motor 52. A hood 54 is provided over the belts 30 to contain waste materials which are forced upward by the blower 50.

In operation, municipal waste is placed in the floor area and passed through a shredder which breaks most of the noncombustible materials in the waste into pieces which are smaller than a selected size. Most of the combustible materials are broken or torn into pieces which are larger than the selected size. The broken waste materials, which are mixed together, are then passed through a magnetic separator 16 which separates ferrous materials from the waste for disposal or further processing. The nonferrous materials in the waste are fed from the separator 16 onto the feed plate 22. Vibrations of the feed plate 22 shake the waste materials so that they tend to lie flat. The vibrations also disperse the materials so that they can be disposed at a desired rate. The separator 24 directs the waste materials into the channels 26 and 28, and onto the conveyor belts 30 in a desired manner. The belts 30 have openings 35 which are sized so that most of the noncombustibles can pass through the openings, but most of the combustibles cannot. As the mixed waste materials are moved on the conveyor belts 30 towards the rollers 32, the cam vibrators 34 shake the belts 30 so that noncombustible materials, such as glass, grit, and the like, fall through the mesh screens 30. The noncombustible materials which pass through the conveyor belt 30 fall onto the second conveyor 44 and are removed from the apparatus. Combustible materials are transported to the rollers 32, where they may be deposited in the fuel area 20. The conveyor belts 30 continue downward past the deraggers 42, where the belts 30 are cleaned. The belts 30 continue along the bottom surface 46 beneath the second conveyor 44, and return to the rollers adjacent the feed plate 22. The skirts 38 direct the materials away from the edges of the belts 30, to protect the mechanical apparatus beneath the edges.

Figure 5:
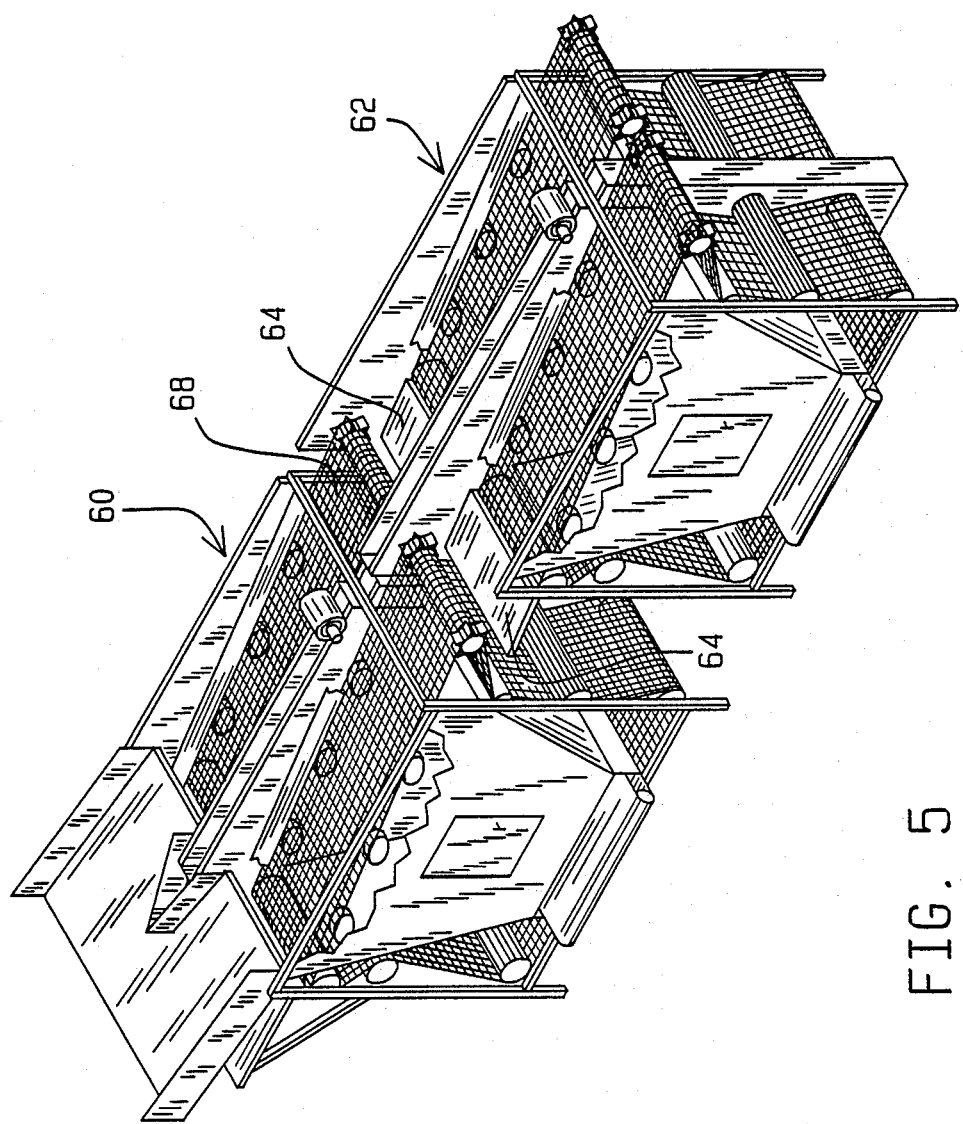
FIG. 5 is a perspective view of a further embodiment of the conveyor apparatus of the subject invention showing two conveyor apparatus connected by a vibrating feed plate.

A further embodiment of the subject invention is shown in FIG. 5, wherein there is shown two conveyor apparatus 60 and 62 substantially as described with reference to FIG. 2. These conveyor apparatus 60 and 62 are connected by vibratory feed plates 64. Screened materials remaining on the conveyor mesh belt 68 of the first conveyor apparatus 60 are placed on the vibratory feed plate 64 where, utilizing the vibratory motion of the plate the material is transported to the second conveyor apparatus 62 for further processing. The vibratory feed plates permit transport of the material to a different vertical plane, thereby allowing changes in elevation between the input and the output of the waste processing apparatus of the subject invention for better flexibility in conforming to the space requirements of a particular application.

Figure 6:
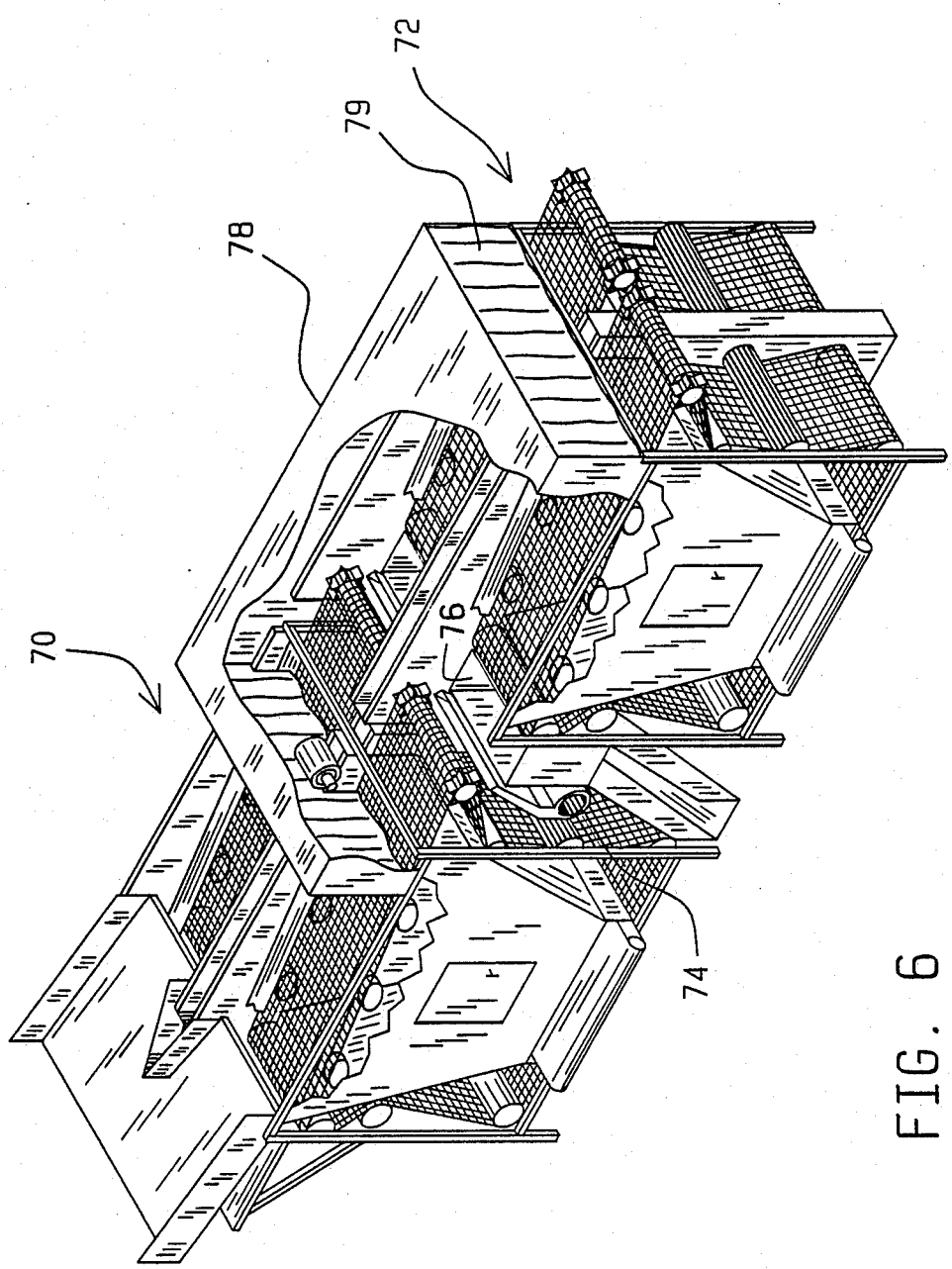
FIG. 6 is a perspective view of still a further embodiment of the subject invention showing the use of an air knife.

FIG. 6 also includes two conveyor apparatus 70 and 72 which are substantially as described with reference to FIG. 2. Located between the conveyor apparatus 70 and 72 is a chute or bin 76 for carrying the heavy material away and a hood or baffle 78 for containing the propelled lightweight material.

The blower 74 may comprise a squirrel cage or other type fan apparatus which has a narrow elongated air outlet for directing a forceful stream of air upwardly along the exit or outlet edge of the conveyor. The fan housing is preferably located under the conveyor belt and oriented to blow the air upwardly against the material falling off the conveyor belt and yet not catch any of such material within the fan housing. The bin 76 is preferably located directly under the exit edge of the conveyor so that it will collect all material falling off the conveyor belt.

A housing or hood 78 is placed over the outlet portion of the first conveyor apparatus 70 and generally all of the second conveyor apparatus 72. The hood 78 catches the light material blown into the air and retains it on the conveyor belt of the second conveyor apparatus 72 for further processing. The heavy materials drop into the bin 76, generally unaffected by the airstream from blower 74. The weight of the material allowed to drop into the bin can be controlled to a limited degree by adjusting the speed of the air flow from blower 74. The higher the ir flow speed, the greater the weight of material which is blown into the hood 78, and conversely, the material falling into bin 76 will be of greater average weight. Hood 78 may have curtains 79 at either end to allow easy access to the hood interior.

The many advantages of this invention are now apparent. Noncombustible matter, such as grits, glass, and the like, may be removed from municipal waste materials, resulting in a more concentrated resultant product which may be used as fuel. The apparatus is efficient and relatively inexpensive, and does not tend to become clogged easily.

While the principles of the invention have been described above in connection with specific apparatus and applications, it is to be understood that this description is made only by way of example and not as a limitation on the scope of the invention.

I claim:

1. Apparatus for separating pieces of material based on size and weight comprising:
   a first vibrating feed plate for directing the pieces of material to a first mesh screen conveyor belt;
   said first conveyor belt forming a substantially flat carrier surface, one end of said surface being adjacent to said feed plate, said first conveyor belt having a plurality of openings, said openings being a predetermined size;
   means for moving said first conveyor belt so that the pieces of materials are transported along said carrier surface toward an opposite exit end of said carrier surface;
   means for vibrating said first conveyor belt as said conveyor belt moves, said means for vibrating comprising a plurality of rotating cams rotatably secured adjacent to said first conveyor belt, the smaller pieces of material passing through said openings as said first conveyor belt moves and vibrates;
   a second conveyor belt having an inlet end spaced laterally from an outlet end of said first conveyor belt, a hood covering said second conveyor belt;
   a collection means between said first conveyor belt and said second conveyor belt; and
   an air knife means comprising a narrow elongated air outlet exterior to and adjacent said outlet end of said first conveyor belt;
   said air knife means blowing a narrow forceful air stream and separating said pieces of material according to weight whereby ighter pieces are blown up into said hood over said second conveyor belt to settle on said second conveyor belt and the heavier pieces are dropped into said collection means.

2. The apparatus of claim 1 wherein said means for vibrating said conveyor belt comprises a plurality of rotating cams rotatably secured adjacent to an under each side of said conveyor belt.

3. The apparatus of claim 1 wherein said air knife means is located under said first conveyor belt and oriented for blowing air upwardly.

* * * * *